United States Patent
Yoshihara

(10) Patent No.: US 6,690,925 B1
(45) Date of Patent: Feb. 10, 2004

(54) PORTABLE TELEPHONE CAPABLE OF INCREASING FACILITY OF OPERATION

(75) Inventor: Shigeo Yoshihara, Shizuoka (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/283,970

(22) Filed: Apr. 2, 1999

(30) Foreign Application Priority Data

Apr. 2, 1998 (JP) .......................................... 10-090277

(51) Int. Cl.$^7$ ................................................. H04B 1/16
(52) U.S. Cl. .................... 455/200.1; 455/566; 455/575; 348/552
(58) Field of Search ................................ 455/556, 566, 455/567, 569, 575, 198.1, 200.1; 379/101.1, 106.1, 388, 395; 725/62, 105, 126, 133, 141, 153; 348/14.01, 14.02, 552

(56) References Cited

U.S. PATENT DOCUMENTS

| | | | |
|---|---|---|---|
| 5,038,202 A | * | 8/1991 | Ooishi et al. ............. 348/396.1 |
| 5,313,661 A | * | 5/1994 | Malmi et al. ............. 455/200.1 |
| 5,404,582 A | * | 4/1995 | Demuro et al. ................ 455/90 |
| 5,448,620 A | * | 9/1995 | Gershkovich et al. ....... 455/552 |
| 5,450,618 A | * | 9/1995 | Naddell et al. ............. 455/575 |
| 5,483,689 A | * | 1/1996 | O'donnell, Jr. et al. ... 455/200.1 |
| 5,724,647 A | * | 3/1998 | Satao .......................... 455/552 |
| 5,749,056 A | * | 5/1998 | Patterson et al. ......... 455/200.1 |
| 6,009,336 A | * | 12/1999 | Harris et al. ................. 455/566 |
| 6,014,573 A | * | 1/2000 | Lehtonen et al. ........... 455/414 |
| 6,038,529 A | * | 3/2000 | Harada ........................ 704/215 |

FOREIGN PATENT DOCUMENTS

JP  8-317041  11/1996

* cited by examiner

Primary Examiner—Dwayne Bost
Assistant Examiner—Sonny Trinh
(74) Attorney, Agent, or Firm—Whitham, Curtis & Christofferson, PC

(57) ABSTRACT

In a portable telephone which transmits and receives data having at least one of a voice signal and an image datum which are radio signals, the controlling device controls an amplifier so that a user can hear, at a first state that an ear is not near to a speaker, the voice from the speaker when the data from a base station includes a discrimination datum which represents the image datum. The controlling device controls the amplifier so that the user can hear, at a second state that the ear is near to the speaker, the voice from the speaker when the data from the base station does not include the discrimination datum which represents the image datum.

12 Claims, 7 Drawing Sheets

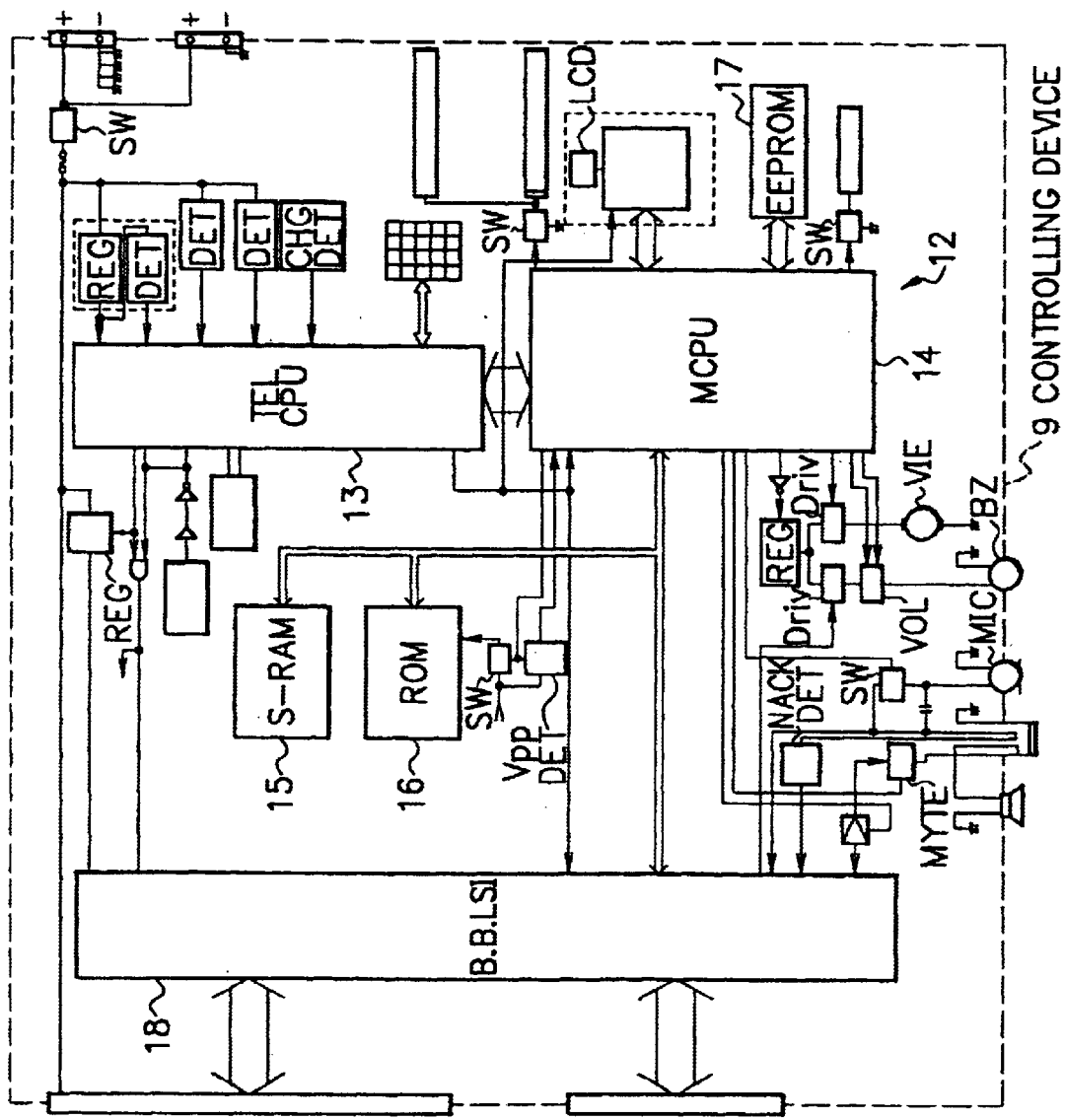
F I G. 3

PORTABLE TELEPHONE CAPABLE OF INCREASING FACILITY OF OPERATION

BACKGROUND OF THE INVENTION

This invention relates to a portable telephone which transmits data having at least one of a voice signal and an image datum which are radio signals to a communicating device through a base station, and which receives the data having at least one of the voice signal and the image datum from the communicating device through the base station.

Recently, image transmission becomes important in accordance with development of communication technology. Therefore, various terminal devices which can execute image transmission are provided. In addition, a conventional portable telephone of the type comprises a body, an antenna, an operation device, a speaker, a display device, a microphone, a camera, a transmitting and receiving device, a controlling device, and amplifiers. The antenna is attached to the body. The operation device, the speaker, the display device, the microphone, and the camera are mounted on the body.

Also, according to development of communication technology, facsimile service that facsimile device requests and receives a necessary datum is executed. Also, pushphone service such as preengagement of an airline ticket and remainder inquiry of a bank deposit is executed. In these services, a user transmits, by operating ten keys of a telephone, datum of a predetermined telephone number to one of these service systems to connect the telephone to the one of these service systems. Thereafter, the user operates the ten keys of the telephone, in response to a guidance message, to transmit data of such as a number (BOX number) representing a datum which is needs for DTMF signal, an account number, and a preengagement time. Thereby, the user can obtain data.

However, in the portable telephone, there is a problem that facility of operation is wrong. This is because, since handset of the portable telephone is integrated with ten keys, the user cups the portable telephone to user's ear when the user hear the guidance messages and the user disconnect the portable telephone from user's ear when the user operates the ten keys. Also, in the portable telephone, there is another problem that the user is hardly able to hear a voice from the speaker when the user disconnect the portable telephone from user's ear to operate the ten keys. In addition, in the portable telephone, there is still another problem that it is needs to set, by such as a switching circuit, a hands free mode in case that the user executes conversation while the user see image data which is displayed.

SUMMARY OF THE INVENTION

It is therefore an object of this invention to provide a portable telephone which is capable of increasing facility of operation.

Other objects of this invention will become clear as the description proceeds.

According to a first aspect of this invention, there is provided a portable telephone which transmits data having at least one of a voice signal and an image datum which are radio signals to a communicating device through a base station and which receives the data having at least one of the voice signal and the image datum from the communicating device through the base station, the portable telephone comprising:

amplifying means for amplifying the voice signal to produce an amplified voice signal;

voice outputting means connected to the amplifying means for outputting a voice when the voice outputting means is supplied with the amplified voice signal;

controlling means connected to the amplifying means for controlling the amplifying means in response to a discrimination datum which represents one kind of the voice signal and the image datum and which is included in a call setting datum which is sent, in a establishment time of a data link, from the base station; and displaying means for displaying the image datum.

According to a second aspect of this invention, there is provided a portable telephone which transmits data having at least one of a voice signal and an image datum which are radio signals to a communicating device through a base station and which receives the data having at least one of the voice signal and the image datum from the communicating device through the base station, the portable telephone comprising:

amplifying means for amplifying the voice signal to produce an amplified voice signal;

voice outputting means connected to the amplifying means for outputting a voice when the voice outputting means is supplied with the amplified voice signal;

controlling means connected to the amplifying means for controlling the amplifying means in response to a discrimination datum which represents one kind of the voice signal and the image datum and which is included in a call setting datum which is sent, in a establishment time of a data link, from the base station; and displaying means for displaying the image datum;

the controlling means controlling the amplifying means so that a user can hear, at a first state that an ear is not near to the voice outputting means, the voice from the voice outputting means when the data from the base station includes the discrimination datum which represents the image datum, the controlling means controlling the amplifying means so that the user can hear, at a second state that the ear is near to the voice outputting means, the voice from the voice outputting means when the data from the base station does not include the discrimination datum which represents the image datum.

According to a third aspect of this invention, there is provided a portable telephone which transmits data having at least one of a voice signal and an image datum which are radio signals to a communicating device through a base station and which receives the data having at least one of the voice signal and the image datum from the communicating device through the base station, the portable telephone comprising:

amplifying means for amplifying the voice signal to produce an amplified voice signal;

first voice outputting means connected to the amplifying means for outputting a first voice when the first voice outputting means is supplied with the amplified voice signal so that a user can hear, at a first state that an ear is not near to the first voice outputting means, the first voice from the first voice outputting means when the data from the base station includes the discrimination datum which represents the image datum;

second voice outputting means for outputting a second voice when the second voice outputting means is supplied with the voice signal so that the user can hear, at a second state that the ear is near to the second voice outputting means, the second voice from the second voice outputting means when the data from the base station does not include the discrimination datum which represents the image datum;

switching means connected to the amplifying means and second voice outputting means for selectively supplying the voice signal to the amplifying means and the second voice outputting means;

controlling means connected to the switching means for controlling the switching means in response to a discrimination datum which represents one kind of the voice signal and the image datum and which is included in a call setting datum which is sent, in a establishment time of a data link, from the base station; and displaying means for displaying the image datum.

According to a fourth aspect of this invention, there is provided a portable telephone which transmits data having at least one of a voice signal and an image datum which are radio signals to a communicating device through a base station and which receives data having at least of the voice signal and the image datum from the communicating device through the base station, the portable telephone comprising:

amplifying means for amplifying the voice signal to produce an amplified voice signal;

first voice outputting means connected to the amplifying means for outputting a first voice when the first voice outputting means is supplied with the amplified voice signal so that a user can hear, at a first state that an ear is not near to the first voice outputting means, the first voice from the first voice outputting means when the data from the base station includes the discrimination datum which represents the image datum;

second voice outputting means for outputting a second voice when the second voice outputting means is supplied with the voice signal so that the user can hear, at a second state that the ear is near to the second voice outputting means, the second voice from the second voice outputting means when the data from the base station does not include the discrimination datum which represents the image datum;

switching means connected to the amplifying means and second voice outputting means for selectively supplying the voice signal to the amplifying means and the second voice outputting means;

controlling means connected to the switching means for controlling the switching means in response to a discrimination datum which represents one kind of the voice signal and the image datum and which is included in a call setting datum which is sent, in a establishment time of a data link, from the base station; and displaying means for displaying the image datum;

the switching means selectively supplying, in response to a first control signal and a second control signal, the voice signal to the amplifying means and the second voice outputting means;

the controlling means producing and supplying the first control signal to the switching means when the data from the base station includes the discrimination datum which represents the image datum, the controlling means producing and supplying the second control signal to the switching means when the data from the base station does not include the discrimination datum which represents the image datum.

BRIEF DESCRIPTION OF THE DRAWINGS

FIG. 3 is a block diagram of a controlling device of the portable telephone illustrated in FIG. 1;

DESCRIPTION OF THE PREFERRED EMBODIMENTS

Figure 1:
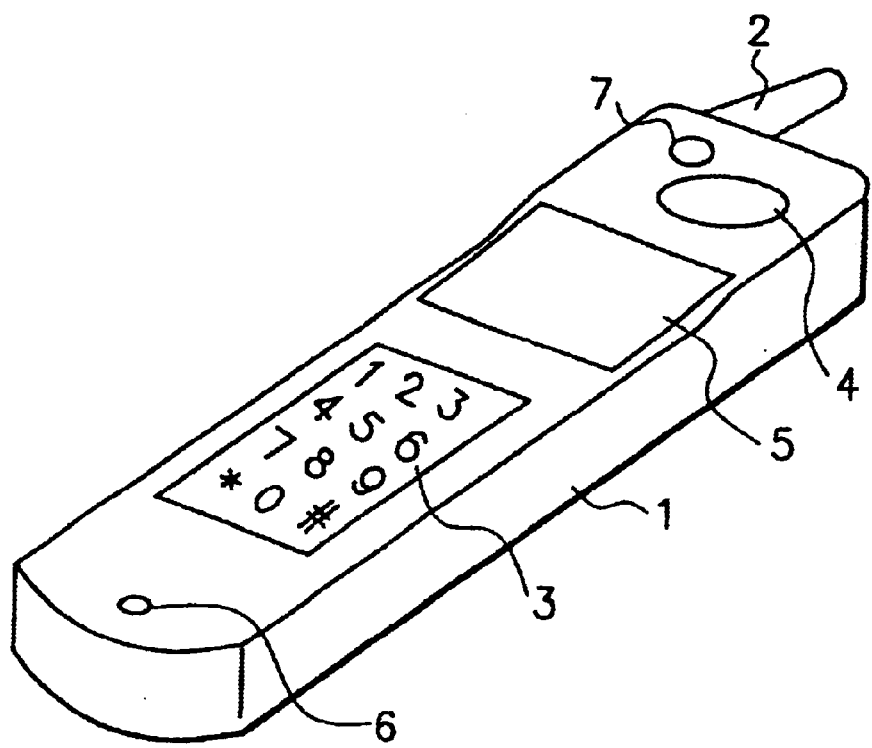
FIG. 1 is a perspective view of a portable telephone according to a first embodiment of this invention.
Figure 2:
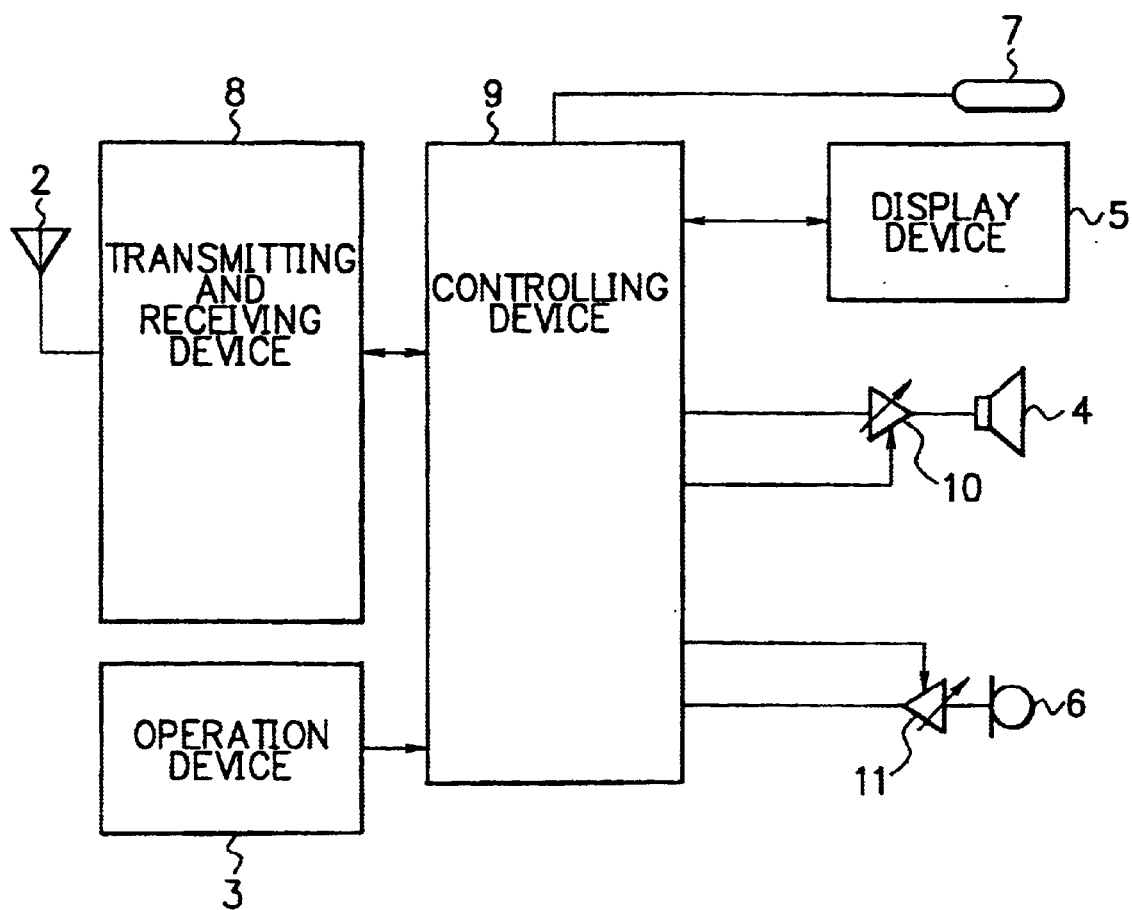
FIG. 2 is a block diagram of the portable telephone illustrated in FIG. 1.

Referring to FIGS. 1 and 2, a portable telephone according to a first embodiment of this invention will be described in detail. The portable telephone transmits data having at least one of a voice signal and an image datum which are radio signals to a communicating device (not shown) through a base station (not shown). The portable telephone receives the data having at least one of the voice signal and the image datum from the communicating device through the base station. The communicating device is implemented by such as a telephone, a portable telephone, and a facsimile device.

The portable telephone comprises a body 1, an antenna 2, an operation device 3, a speaker 4, a display device 5, a microphone 6, a camera 7, a transmitting and receiving device 8, a controlling device 9, and amplifiers 10 and 11. The antenna 2 is attached to the body 1. The operation device 3, the speaker 4, the display device 5, the microphone 6, and the camera 7 are mounted on the body 1. The transmitting and receiving device 8, the controlling device 9, and the amplifiers 10 and 11 are positioned in the body 1. The transmitting and receiving device 8 is connected to the antenna 2 and to the controlling device 9. The operation device 3, the display device 5, the microphone 6, the camera 7, and the amplifiers 10 and 11 are connected to the controlling device 9. The speaker 4 and the microphone 6 are connected to the amplifiers 10 and 11, respectively.

The antenna 2 transmits the data to the communicating device through the base station. The antenna 2 receives the data from the communicating device through the base station to produce a receiving data having at least one of the voice signal and the image datum. The antenna 2 supplies the receiving data to the transmitting and receiving device 8. The transmitting and receiving device 8 receives the receiving data from the antenna 1 and supplies the receiving data to the controlling device 9. The operation device 3 supplies operation signals to the controlling device 9.

The controlling device 9 receives the receiving data having at least one of the voice signal and the image datum from the transmitting and receiving device 8 In this time, the controlling device 9 supplies the voice signal to the speaker 4 through the amplifier 10 and supplies the image datum to the display device 5. The amplifier 10 receives the voice signal from the controlling device 9 and amplifies the voice signal to produce an amplified voice signal. The amplifier 10 supplies the amplified voice signal to the speaker 4. The speaker 4 receives the amplified voice signal from the amplifier 10 to output a voice.

The controlling device 9 controls the amplifier 10 in response to a discrimination datum which represents one kind of the voice signal and the image datum and which is included in a call setting datum which is sent, in a establishment time of a data link, from the base station.

The controlling device 9 controls the amplifier 10 so that a user can hear, at a first state that an ear is not near to the speaker 4, the voice from the speaker 4 when the data from the base station includes the discrimination datum which represents the image datum, namely, in a hands free mode or in a voice enlarging mode. Also, the controlling device 9 controls the amplifier 10 so that the user can hear, at a second state that the ear is near to the speaker 4, the voice from the speaker 4 when the data from the base station does not include the discrimination datum which represents the image datum, namely, in a voice normal mode. The discrimination datum is defined by transmission capacity. The transmission capacity represents a data transfer capacity and a data transfer velocity. The display device 5 receives the image datum from the controlling device 9 and displays the image datum.

The microphone 6 receives a transmitting voice to produce and supply an analog transmitting voice signal to the amplifier 11. The amplifier 11 receives the analog transmitting voice signal and amplifies the analog transmitting voice signal to produce and supply a amplified transmitting voice signal to the controlling device 9. The controlling device 9 controls the amplifier 11. The controlling device 9 receives the amplified transmitting voice signal. The controlling device 9 encodes the amplified transmitting voice signal to produce an encoded transmitting voice signal. In addition, the controlling device 9 modulates, by frequency modulation, the encoded transmitting voice signal to produce a modulated transmitting voice signal.

The controlling device 9 supplies the modulated transmitting voice signal, as the transmitting voice signal to the transmitting and receiving device 8. The transmitting and receiving device 8 receives the transmitting voice signal and supplies the transmitting voice signal to the antenna 2. The antenna 2 receives the transmitting voice signal and transmits the transmitting voice signal, as the voice signal, to the base station.

The camera 7 produces a transmitting image datum to supply the transmitting image signal to the controlling device 9. The controlling device 9 receives the transmitting image datum. The controlling device 9 encodes the transmitting image signal to produce an encoded transmitting image datum. In addition, the controlling device 9 modulates, by frequency modulation, the encoded transmitting image datum to produce a modulated transmitting image datum.

The controlling device 9 supplies the modulated transmitting image datum, as the transmitting image datum to the transmitting and receiving device 8. The transmitting and receiving device 8 receives the transmitting image datum and supplies the transmitting image datum to the antenna 2. The antenna 2 receives the transmitting image datum and transmits the transmitting image datum, as the image datum, to the base station.

Referring to FIG. 3, the controlling device 9 comprises a main controlling section 12, a substitute controlling section 13, and a baseband section 14. The substitute controlling section 13 chiefly executes monitor of a power supply voltage, monitor of installation of a battery charger, monitor of keyed input and reset control of a power supply of the main controlling section 12. The substitute controlling section 13 is implemented by a substitute microcomputer which has ROMs and RAMs. The substitute microcomputer is operated by a main system clock signal having 2.45 MHz and a substitute system clock signal having 32.0 KHz. Initially, the substitute microcomputer is operated by the main system clock signal having 2.45 MHz. After the substitute system clock signal has the stable 32.0 KHz, the substitute microcomputer is operated by the substitute system clock signal instead of the main system clock signal and the substitute microcomputer stops to produce the main system clock signal. Thereby, it is possible to decrease consumption electric power.

The main controlling section 12 is implemented by a main microcomputer 14, a flash ROM 15, a SRAM 16, a EEPROM 17, and these peripheral circuits. The main microcomputer executes such as control of the transmitting and receiving device 8, control of the speaker 4, control of the amplifier 10, control of the microphone 6, control of the amplifier, control of the display device 5, and monitor of keyed input through the substitute controlling section 13. The main microcomputer 14 has such as input output terminals, serial interfaces, a timer, and an interrupt controller. The main microcomputer 14 is operated by a clock signal having 16 MHz. The main microcomputer 14 controls parts of the portable telephone. A program of the flash ROM 15 is able to be rewritten by an outside device through an outside interface connector.

The baseband section 15 is implemented by such as a modulating and demodulating section, a channel codec section, a radio controlling section, and a voice processing section. The baseband section 15 receives the amplified transmitting voice signal from the microphone 6 through the amplifier 11 and encodes, by PCM and ADPCM, the amplified transmitting voice signal to produce a encoded voice signal. The channel codec section decodes the encoded voice signal to produce and supply the transmitting voice signal to the transmitting and receiving device 8.

Also, the baseband section 15 receives the receiving data having at least one of the image datum and the voice signal. When the baseband section 15 receives the voice signal, the baseband section 14 demodulates the voice signal to produce a demodulated voice signal and encodes, by ADPCM and PCM, the demodulated voice signal to produce an encoded voice signal. The baseband section 15 supplies the encoded voice signal, as the voice signal, to the speaker 4 though the amplifier 10. At this time, the controlling device 9 controls the amplifier 10 so that the user can hear, at the first state that the ear is not near to the speaker 4, the voice from the speaker 4 when the data from the base station includes the discrimination datum which represents the image datum, namely, in the hands free mode or in the voice enlarging mode. Also, the controlling device 9 controls the amplifier 10 so that the user can hear, at the second state that the ear is near to the speaker 4, the voice from the speaker 4 when the data from the base station does not include the discrimination datum which represents the image datum, in the voice normal mode.

Figure 4:
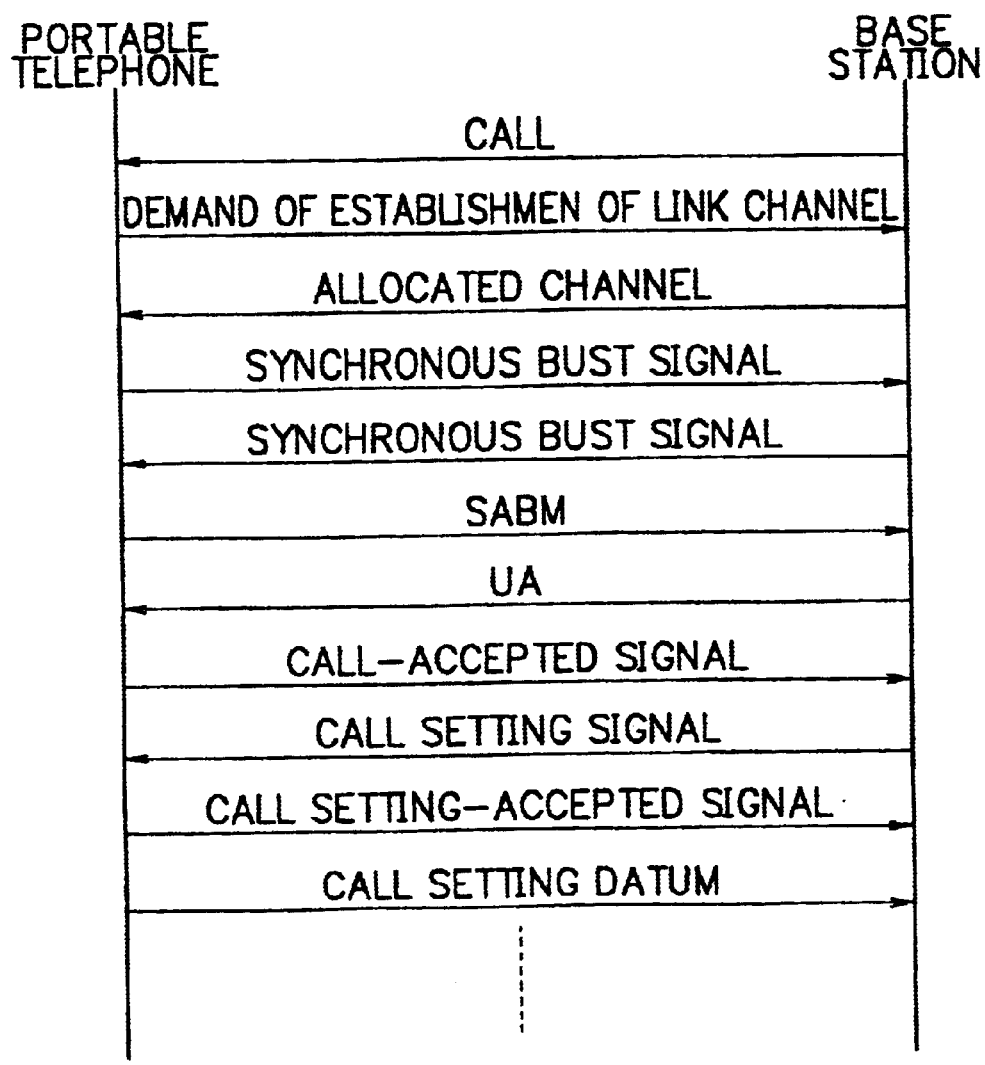
FIG. 4 is a view for use in describing an operation of the portable telephone illustrated in FIG. 1.

Referring to FIG. 4, an operation of the portable telephone will be described in detail. The portable telephone transmits, at an establishment time of a data link between the base station, the data having at least one of both of the voice signal and the image datum and the discrimination datum which is defined by transmission capacity. The transmission capacity is included in a call setting datum. The transmission capacity represents the data transfer capacity and the data transfer velocity.

The portable telephone transmits, as the octet 3 of the call setting datum, the data transfer capacity. Also, the portable telephone transmits, as the octet 4 of the call setting datum, the data transfer velocity. For example, in the data transfer capacity which is transferred by the octet 3, bit "00000" represents voice, bit "01000" represents data of 32K, bit "01001" represents data of 64K, bit "10000" represents audio of 3.1K, and other bits represent data transfer capacities which are predetermined. For example, in the data transfer velocity which is transferred by the octet 4, bit "00111" represents transfer velocity of 8 kbit/s, bit "01010" represents transfer velocity of 16 kbit/s, bit "01100" represents transfer velocity of 32 kbit/s, bit "10000" represents transfer velocity of 64 kbit/s, and other bits represent data transfer velocities which are predetermined.

As shown in FIG. 4, when the portable telephone receives a call from the base station, the portable telephone transmits a demand of establishment of link channel to the base station. When the base station receives the demand of establishment of link channel, the base station allocates a channel, as an allocated channel. The base station transmits datum of the allocated channel to the portable telephone. The portable telephone transmits a synchronous bust signal to the base station. The base station transmits another synchronous bust signal to the portable telephone. Next, the portable telephone transmits command of SABM (Set Asynchronous Balanced Mode) to the base station. When the base station receives the command of SABM, the base station transmits response of UA (Unnumbered Acknowledge) to the portable telephone.

When the portable telephone receives the response of UA, the portable telephone transmits a call-accepted signal to the base station. When the base station receives the call-accepted signal, the base station transmits a call setting signal to the portable telephone. When the portable telephone receives call setting signal, the portable telephone transmits a call setting-accepted signal to the base station. Also, the portable telephone transmits the call setting datum which includes the transmission capacity to the base station. When the base station receives the call setting datum, the base station transmits a call setting-accepted signal to portable telephone.

Figure 5:
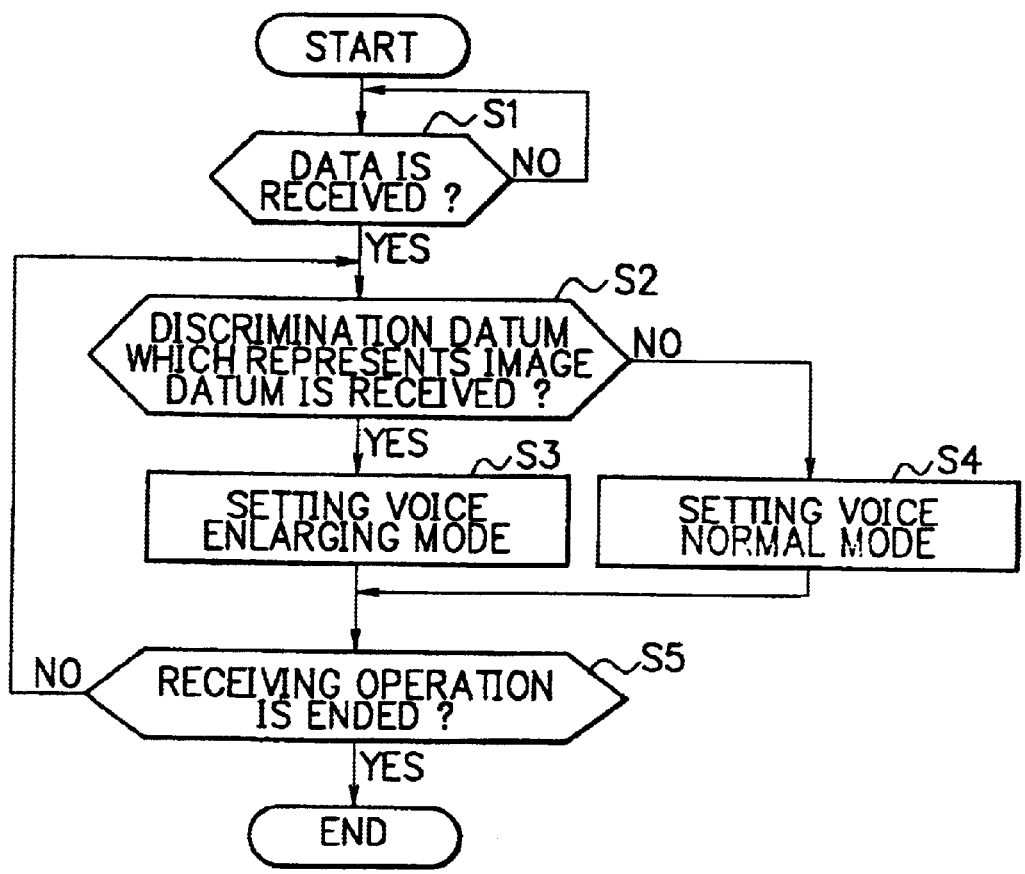
FIG. 5 is a flow chart for use in describing another operation of the portable telephone illustrated in FIG. 1.

Referring to FIG. 5, a receiving operation of the portable telephone will be described in detail. At a step S1, the portable telephone judges whether or not the portable telephone receives the data from the base station. When the portable telephone receives the data, at a step S2, the portable telephone judges whether or not the data includes the discrimination datum which represents the image datum. When the data includes the discrimination datum which represents the image datum, at a step S3, the portable telephone sets the voice enlarging mode, namely, the hands free mode. The voice enlarging mode represents a mode that the controlling device 9 controls the amplifier 10 so that the user can hear, at the first state that the ear is not near to the speaker 4, voice from the speaker 4.

At the step S2, when the data does not include the discrimination datum which represents the image datum, at a step S4, the portable telephone sets the voice normal mode. The voice normal mode represents a mode that he controlling device 9 controls the amplifier 10 so that the user can hear, at the second state that the ear is near to the speaker 4, the voice from the speaker4. A step S5 follows the steps S3 and S4 to judge, by the portable telephone, whether or not a receiving operation is ended. When the receiving operation is not ended, the step S5 returns to the step S2.

Figure 6:
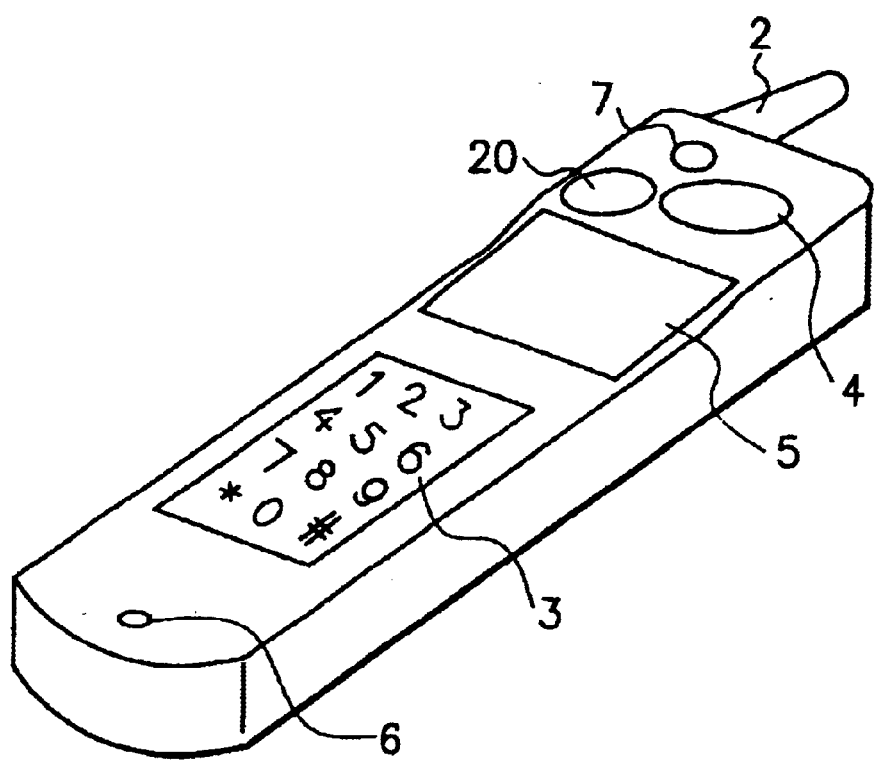
FIG. 6 is a perspective view of a portable telephone according to a second embodiment of this invention.
Figure 7:
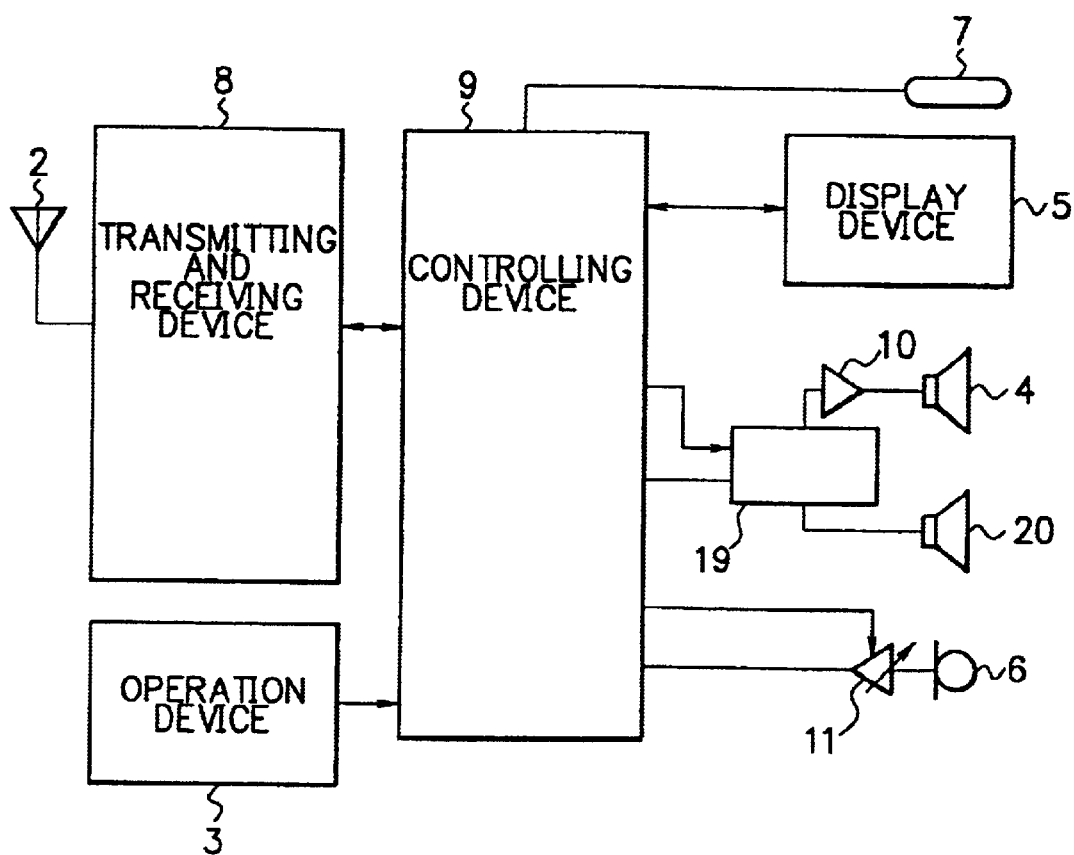
FIG. 7 is a block diagram of the portable telephone illustrated in FIG. 6.

Referring to FIGS. 6 and 7, the description will proceed to a portable telephone according to a second embodiment of this invention. Similar parts are designated by like reference numerals.

The portable telephone comprises the body 1, the antenna 2, the operation device 3, the speaker 4, the display device 5, the microphone 6, the camera 7, the transmitting and receiving device 8, the controlling device 9, the amplifiers 10 and 11, a switching circuit 19, and another speaker 20. The switching circuit 19 is connected to the controlling device 9 and to the speakers 4 and 20.

The speaker 4 outputs a first voice when the speaker 4 is supplied with the amplified voice signal from the amplifier 10 so that the user can hear, at the first state that the ear is not near to the speaker 4, the first voice from the speaker 4 when the data from the base station includes the discrimination datum which represents the image datum, namely, in the voice enlarging mode. The speaker 20 outputs a second voice when the speaker 20 is supplied with the voice signal form the controlling device 9 so that the user can hear, at the second state that the ear is near to the speaker 20, the second voice from the speaker 20 when the data from the base station does not include the discrimination datum which represents the image datum, namely, in the voice normal mode.

The switching circuit 19 selectively supplies, in response to a first control signal and a second control signal, the voice signal to the amplifier 10 (the speaker 4) and the speaker 20. The controlling device produces and supplies the first control signal to the switching circuit 19 when the data from the base station includes the discrimination datum which represents the image datum. Also, the controlling device 9 produces and supplies the second control signal to the switching circuit 19 when the data from the base station does not include the discrimination datum which represents the image datum.

According to the embodiments of this invention, the portable telephone produces is set so that the user can hear, at the first state that the ear is not near to the speaker 4, the first voice from the speaker 4 when the data from the base station includes the discrimination datum which represents the image datum. Also, the portable telephone produces is set so that the user can hear, at the second state that the ear is near to the speaker 4 or 20, the second voice from the speaker 4 or 20 when the data from the base station does not include the discrimination datum which represents the image datum. Thereby, it is possible to increase facility of an operation of the portable telephone.

What is claimed is:

1. A portable telephone which transmits data having at least one of a voice signal and an image datum which are radio signals to a communicating device through a base station and which receives said data from said communicating device through said base station, said portable telephone comprising:

amplifying means for amplifying said voice signal to produce an amplified voice signal;

voice outputting means connected to said amplifying means for outputting a voice when said amplified voice signal is provided thereto;

controlling means, connected to amplifying means for controlling said amplifying means to adjust an amplification amount applied to said voice signal depending on whether or not said data transmitted to said portable telephone from said base station in an establishment time of a data link include a discrimination datum which represents both of said voice signal and said image datum; and displaying means for displaying said image datum.

2. A portable telephone as claimed in claim 1, said discrimination datum is defined by transmission capacity.

3. A portable telephone as claimed in claim 2, said transmission capacity represents a data transfer capacity and a data transfer velocity.

4. A portable telephone which transmits data having at least one of a voice signal and an image datum which are radio signals to a communicating device through a base station and which receives said data having at least one of said voice signal and said image datum from said communicating device through said base station, said portable telephone comprising:

amplifying means for amplifying said voice signal to produce an amplified voice signal;

voice outputting means connected to said amplifying means for outputting a voice when said voice outputting means is supplied with said amplified voice signal;

controlling means connected to said amplifying means for controlling said amplifying means in response to a discrimination datum which represents one kind of said voice signal and said image datum and which is included in a call setting datum which is sent, in a establishment time of a data link, from said base station; and displaying means for displaying said image datum;

said controlling means controlling said amplifying means so that a user can hear, at a first state that an ear is not near to said voice outputting means, said voice from said voice outputting means when said data from said base station includes said discrimination datum which represents said image datum, said controlling means controlling said amplifying means so that said user can hear, at a second state that said ear is near to said voice outputting means, said voice from said voice outputting means when said data from said base station does not include said discrimination datum which represents said image datum.

5. A portable telephone as claimed in claim 4, said discrimination datum is defined by transmission capacity.

6. A portable telephone as claimed in claim 5, said transmission capacity represents a data transfer capacity and a data transfer velocity.

7. A portable telephone which transmits data having at least one of a voice signal and an image datum which are radio signals to a communicating device through a base station and which receives said data having at least one of said voice signal and said image datum from said communicating device through said base station, said portable telephone comprising:

amplifying means for amplifying said voice signal to produce an amplified voice signal;

first voice outputting means connected to said amplifying means for outputting a first voice when said first voice outputting means is supplied with said amplified voice signal so that a user can hear, at a first state that an ear is not near to said first voice outputting means, said first voice from said first voice outputting means when said data from said base station includes said discrimination datum which represents said image datum;

second voice outputting means for outputting a second voice when said second voice outputting means is supplied with said voice signal so that said user can hear, at a second state that said ear is near to said second voice outputting means, said second voice from said second voice outputting means when said data from said base station does not include said discrimination datum which represents said image datum;

switching means connected to said amplifying means and second voice outputting means for selectively supplying said voice signal to said amplifying means and said second voice outputting means;

controlling means connected to said switching means for controlling said switching means in response to a discrimination datum which represents one kind of said voice signal and said image datum and which is included in a call setting datum which is sent, in a establishment time of a data link, from said base station; and displaying means for displaying said image datum.

8. A portable telephone as claimed in claim 7, said discrimination datum is defined by transmission capacity.

9. A portable telephone as claimed in claim 8, said transmission capacity represents a data transfer capacity and a data transfer velocity.

10. A portable telephone which transmits data having at least one of a voice signal and an image datum which are radio signals to a communicating device through a base station and which receives data having at least of said voice signal and said image datum from said communicating device through said base station, said portable telephone comprising:

amplifying means for amplifying said voice signal to produce an amplified voice signal;

first voice outputting means connected to said amplifying means for outputting a first voice when said first voice outputting means is supplied with said amplified voice signal so that a user can hear, at a first state that an ear is not near to said first voice outputting means, said first voice from said first voice outputting means when said data from said base station includes said discrimination datum which represents said image datum;

second voice outputting means for outputting a second voice when said second voice outputting means is supplied with said voice signal so that said user can hear, at a second state that said ear is near to said second voice outputting means, said second voice from said second voice outputting means when said data from said base station does not include said discrimination datum which represents said image datum;

switching means connected to said amplifying means and second voice outputting means for selectively supplying said voice signal to said amplifying means and said second voice outputting means;

controlling means connected to said switching means for controlling said switching means in response to a discrimination datum which represents one kind of said voice signal and said image datum and which is included in a call setting datum which is sent, in a establishment time of a data link, from said base station; and displaying means for displaying said image datum;

said switching means selectively supplying, in response to a first control signal and a second control signal, said voice signal to said amplifying means and said second voice outputting means;

said controlling means producing and supplying said first control signal to said switching means when said data from said base station includes said discrimination datum which represents said image datum, said controlling means producing and supplying said second control signal to said switching means when said data from said base station does not include said discrimination datum which represents said image datum.

11. A portable telephone as claimed in claim 10, said discrimination datum is defined by transmission capacity.

12. A portable telephone as claimed in claim 11, said transmission capacity represents a data transfer capacity and a data transfer velocity.

* * * * *